US005146238A

United States Patent [19]

Numabe et al.

[11] Patent Number: 5,146,238

[45] Date of Patent: Sep. 8, 1992

[54] LINE-TYPE THERMAL PRINTING APPARATUS FOR PRINTING ON A SHEET HAVING DIFFERENT THICKNESSES

[75] Inventors: Hideo Numabe, Miyagi; Genji Oshino, Shibata, both of Japan

[73] Assignees: Tohoku Ricoh Co., Ltd., Oaza Shibata; Nitto Denko Corporation, Ibaraki, both of Japan

[21] Appl. No.: 709,230

[22] Filed: Jun. 3, 1991

[30] Foreign Application Priority Data

Jun. 8, 1990 [JP] Japan .................................. 2-150332

[51] Int. Cl.[5] ........................ G01D 15/10; B41J 2/325; B41J 11/04

[52] U.S. Cl. ................................ 346/76 PH; 346/134; 346/136; 400/120; 400/585; 400/648

[58] Field of Search .................. 346/76 PH, 134, 136; 400/24, 26, 648, 659, 662, 636, 636.3, 637, 637.3-637.6, 641, 120, 585, 588, 660.3

[56] References Cited

U.S. PATENT DOCUMENTS 4,143,977 3/1979 Kurihara et al. ..................... 400/24
4,346,883 8/1982 Speraggi .............................. 400/24
5,026,185 6/1991 Kusabuka ........................... 400/637

FOREIGN PATENT DOCUMENTS 0212927 8/1984 Fed. Rep. of Germany ...... 400/659
0082776 5/1983 Japan ..................................... 400/24

*Primary Examiner*—Benjamin R. Fuller
*Assistant Examiner*—Huan Tran
*Attorney, Agent, or Firm*—Spencer, Frank & Schneider

[57] ABSTRACT

A line-type thermal printing apparatus includes a thermal head for recording on a sheet whose thickness is even in the feeding direction thereof and uneven in the print line direction. The apparatus also includes a platen having a platen body portion that rotates integrally with a platen shaft and that feeds the sheet by pinching a part of the sheet between the thermal head and the platen body portion, and separate platen portion that face other parts of the sheet which have thicknesses different from that of the part of the sheet pinched between the thermal head and the platen body portion. The separate platen portions have center holes that are dimensioned to loosely fit the platen shaft. Urging mechanisms are provided for urging the separate platen portions so as to press the other parts of the sheet against the thermal head. For example, a part of a sheet is located opposite to the platen body portion and the other parts of the sheet are located opposite to the separate platen portions. While the part of the sheet is pressed against the platen body portion, the separate platen portions are urged by the urging mechanisms so as to press the other parts of the sheet against the thermal head. The sheet is fed by rotating the platen body portion while recording is sequentially performed by the thermal head.

8 Claims, 2 Drawing Sheets

LINE-TYPE THERMAL PRINTING APPARATUS FOR PRINTING ON A SHEET HAVING DIFFERENT THICKNESSES

BACKGROUND OF THE INVENTION

1. Field of the Invention

The present invention relates to a printing apparatus capable of recording on a sheet, such as a thermal printer using a line thermal head, and more particularly to a line-type thermal printing apparatus capable of nipping or pinching a sheet, whose thickness is even in the feeding direction thereof and uneven in the print line direction, between a thermal head and a platen, and feeding the sheet by rotating the platen during recording with the thermal head.

2. Description of the Related Art

As shown in FIG. 4, one kind of conventional line-type thermal printing apparatus uses a sheet 1, such as paper, whose surface is used as a print plane and which has a thin portion a and thick portions b and c formed by sticking tapes 2 and 3 on both sides. The thickness of the sheet 1 is even in the feeding direction thereof, indicated by the arrow in the FIG. 4, and uneven in the print line direction, and differences $\delta_1$ and $\delta_2$ in thickness are formed between the thin portion a and a thick portion b and between the thin portion a and the thick portion c, respectively. In this case, a platen 5 integrally having a platen shaft 4 is made of a material having low hardness, such as chloroprene rubber or silicon rubber. Small portions 5*b* and 5*c*, whose diameters are smaller by the thickness of the tapes 2 and 3, are formed on both ends of the platen 5 so that differences $\delta_3$ and $\delta_4$ in diameter are obtained between a large portion 5*a* and the small portion 5*c*. Such a construction permits the platen 5 to press uniformly against the sheet 1.

However, in such à line-type thermal printing apparatus having the above construction, the differences $\delta_1$ and $\delta_2$ in the thickness of the sheet 1 in the print line direction are uneven. Furthermore, the differences $\delta_3$ and $\delta_4$ in diameter between the large portion 5*a* and the small portions 5*b* and 5*c* are also uneven.

Therefore, since a thermal head and the platen 5 cannot uniformly nip the sheet 1 in the print line direction and there are differences in the pressure applied on the print plane and resulting differences in the print density, the printed characters are not clear.

Another conventional printing apparatus copes with the differences $\delta_1$ and $\delta_2$ in thickness of the sheet 1 in the print line direction and the differences $\delta_3$ and $\delta_4$ in diameter between the large portion 5*a* and the small portions 5*b* and 5*c* of the platen 5 by using different rubber hardness or different materials for the large portion 5*a* and the small portions 5*b* and 5*c* of the platen 5. However, even if the platen 5 can be always in contact with the uneven plane of the sheet 1, the platen 5 cannot be in contact with the sheet 1 under uniform pressure.

Furthermore, since the large portion 5*a* and the small portions 5*b* and 5*c* of the platen 5 each are integrally formed with the platen shaft 4, the peripheral velocity of the surface of the platen 5 varies while the platen 5 is rotating. Therefore, there are differences in feeding speed between the thin portion a and the thick portions b and c of the sheet 1, and if the sheet 1 is thin and soft, wrinkles and so on are likely to occur.

SUMMARY OF THE INVENTION

An object of the present invention is to provide a line-type thermal printing apparatus which is capable of clearly recording on even a sheet whose thickness is even in the feeding direction, thereof and uneven in the print line direction and which prevents the sheet from wrinkling and so on even if it is thin.

In order to achieve the above object, a line-type thermal printing apparatus in accordance with the present invention, includes a thermal head for recording on a sheet whose thickness is even in the feeding direction thereof and uneven in the print line direction, a platen body portion which rotates integrally with a platen shaft and which feeds the sheet by pressing part of the sheet against the thermal head, separate platen portions which have center holes that fit the platen shaft and which face other parts of the sheet whose thickness is different from that of the part of the sheet pressed against the thermal head by the platen body portion, and an urging means for urging the separate platen portions so as to press the other parts of the sheet against the thermal head.

For example, part of a sheet is located opposite to the platen body portion and the other parts of the sheet are located opposite to the separate platen portions. While the part of the sheet is pinched between the thermal head and the platen body portion, the urging means presses the separate platen portions so as to pinch the other parts of the sheet between thermal head and the separate platen portions. The sheet is fed by rotating the platen body portion while recording is sequentially performed by the thermal head.

In a line-type thermal printing apparatus according to the present invention, an urging means is composed of a bracket rotatable on a supporting shaft, a pair of rollers retained by the bracket in parallel, and an elastic member for urging the bracket, thereby pressing the pair of roller against a separate platen portion so as to pinch the sheet between the separate platen portion and the thermal head.

Furthermore, in a line-type thermal printing apparatus according to the present invention, the force received by the platen body portion per unit length by head and the separate platen portions pinching part of the thermal head is equal to the reactive force received by the separate platen portions per unit length by pinching part of the sheet between the platen body portion and the separate platen portions and the thermal head.

The sheet whose thickness is uneven in the print line direction is pinched between the platen and the thermal head with uniform force and recording in uniform density is achieved on the sheet.

Moreover, in a line-type printing apparatus according to the present invention, the platen body portion is disposed opposite to a thin portion of the sheet, and the separate platen portions are disposed opposite to thick portions of the sheet on both sides of the platen body portion.

In a line-type thermal printing apparatus according to the present invention, the length of the platen body portion is smaller that the width of the thin portion of the sheet in the print line direction.

DESCRIPTION OF THE PREFERRED EMBODIMENTS

The present invention will now be described in more detail with reference to the drawings.

Figure 3:
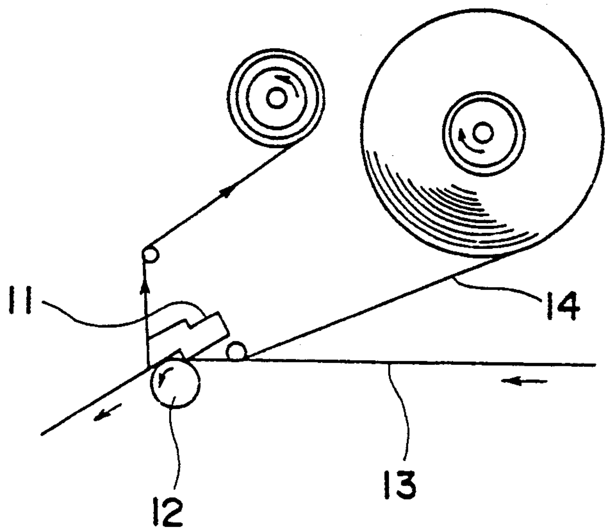
FIG. 3 is a schematic construction view of the main part of the thermal printer shown in FIG. 1.
Figure 4:
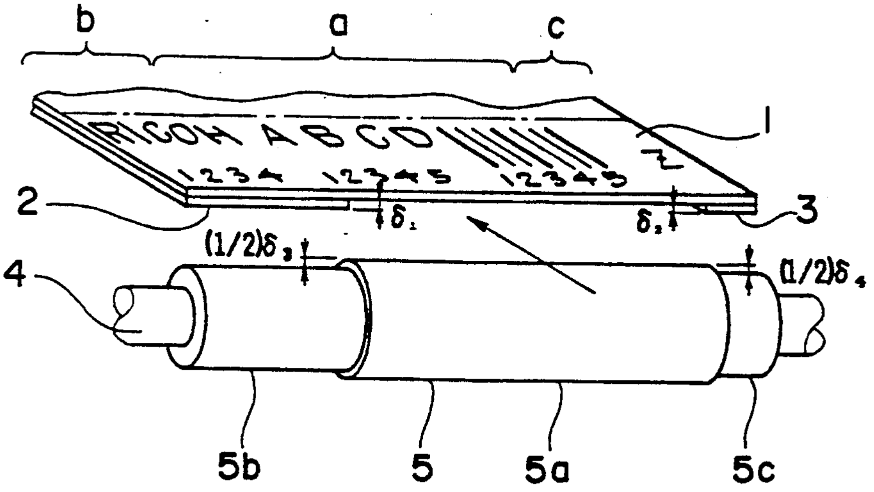
FIG. 4 (PRIOR ART)
FIG. 4 is a perspective view of a conventional thermal printer, which separately shows a platen and a sheet.

FIG. 3 schematically shows the construction of a line-type thermal printer according to an embodiment of the present invention. Numeral 13 denotes a sheet. A thermal transfer ribbon 14 is overlaid on the sheet 13 and the thermal transfer ribbon 14 and the sheet 13 are put between a thermal head 11 and a platen 12. Printing is performed on the sheet 13 by supplying electric power to the thermal head 11 and applying heat produced by the thermal head 11 to the thermal transfer ribbon 14. Then, the sheet 13 is fed together with the thermal transfer ribbon 14 by rotating the platen 12.

Figure 1:
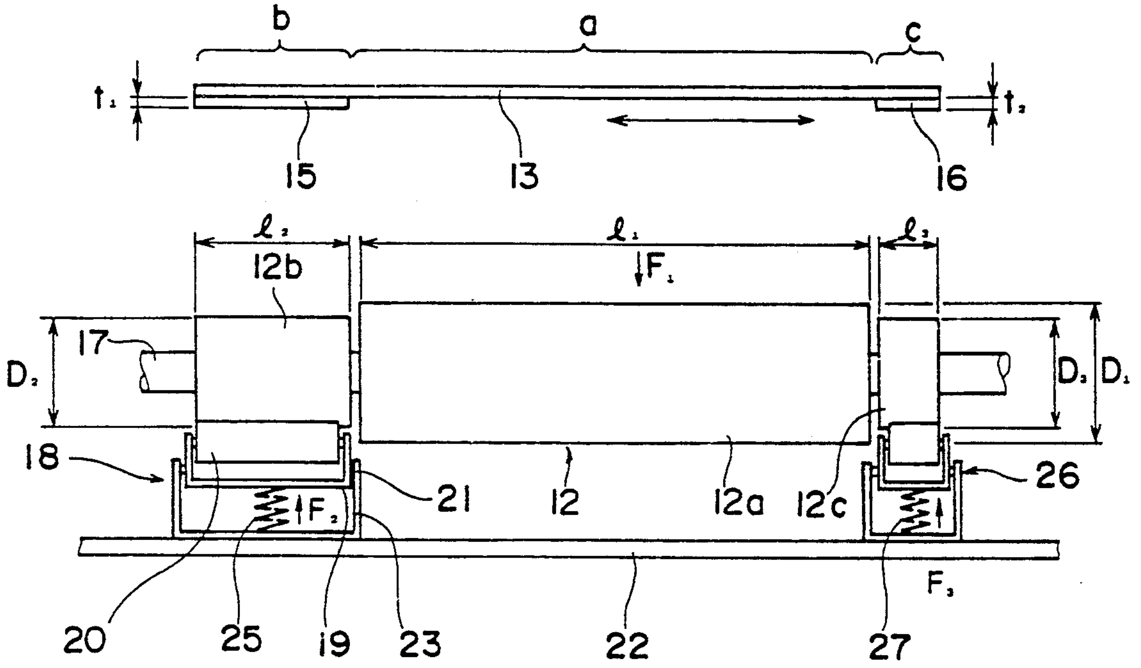
FIG. 1 is a front view of a line-type thermal printer according to an embodiment of the present invention, which separately shows a platen and a sheet.

Furthermore, as shown in FIG. 1, tapes 15 and 16 are stuck onto both sides of the sheet 13 in the print direction so as to form a thin portion a and thick portions b and c. The thickness of the sheet 13 is even in the feeding direction thereof, and there are differences $T_1$ and $t_2$, corresponding to the thickness of the tapes 15 and 16, between the thick portion b and the thin portion a and between the thick portion c and the thin portion a in the print line direction. The print line direction is indicated by an arrow in FIG. 1 and is perpendicular to the feeding direction.

Figure 2:
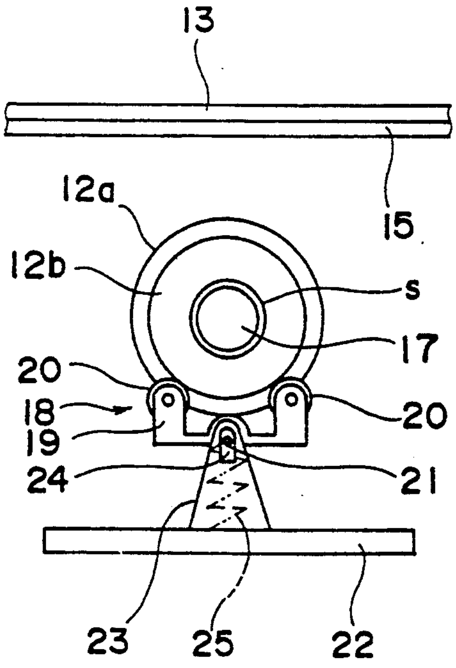
FIG. 2 is a side view of the thermal printer shown in FIG. 1.

Similarly, as shown in FIG. 1, the platen 12 is composed of a platen body portion 12*a*, separate platen portions 12*b* and 12*c* each having a small diameter and disposed on both sides of the platen body portion 12*a*, and a platen shaft 17. The platen body portion 12*a* and the platen shaft 17 are integrally mounted. As shown in FIG. 2, the platen shaft 17 is loosely and rotatably fitted into center holes of the separate platen portions 12*b* and 12*c* with a space s, and prevented from coming out of the center holes by unillustrated stopper or the like.

The outside diameters $D_2$ and $D_3$ are smaller by double of differences $t_1$ and $t_2$ in thickness of the sheet 13, respectively, than the outside diameter $D_1$ of the platen body portion 12*a*. The length $l_1$ of the platen body portion 12*a* is smaller than the width of the thin portion a of the sheet 13 to accommodate differences in width of the thin portion a of the sheet 13 and slippage of the sheet 13 in the width direction while being transported. On the other hand, the lengths $l_2$ and $l_3$ of the separate platen portions 12*b* and 12*c* are equal to or smaller than the widths of the thick portions b and c.

Numeral 18 in FIG. 1 denotes an urging means for urging the separate platen portion 12*b* toward the thermal head 11. The urging means 18, as shown in FIG. 2, supports a pair of rollers 20 and 20, which are parallel with the axis of the platen 12, rotatably on a supporting shaft 21 by a bracket 19. The supporting shaft 21 protrudes from the centers of both ends of the bracket 19 and is inserted into a long hole or slot 24 of a stay 23 mounted on a base plate 22. Then, the bracket 19 is urged toward the separate platen portion 12*b* along the long hole 24 by a coil spring (elastic member) 25 disposed between the bracket 19 and the stay 23, and the rollers 20 and 20 are pressed against the separate platen portion 12*b*.

If the total pressure received by the platen body portion 12*a* when the thermal head 11 is pressed against the platen body portion 12*a* is $F_1$, the urging force $F_2$ of the coil spring 25 is set so that the pressure received per unit length by the separate platen portion 12*b* (which has a length of $l_2$) is almost equal to the pressure received per unit length by the platen body portion 12*a*, that is, the force $F_2$ is set at almost $(F_1/l_1)\times l_2$.

As for the other separate platen portion 12*c*, an urging means 26 having the same construction as above is employed. Urging means 26 includes whose urging force $F_3$ is set in the same manner as that discussed above.

The thin portion a of the sheet 13 is located opposite to the platen body portion 12*a* and the thermal head 11 is pressed against the platen 12 through the thin portion a. On the other hand, the thick portions b and c of the sheet 13 are located opposite to the separate platen portions 12*b* and 12*c*, and the separate platen portions 12*b* and 12*c* are urged by the urging means 18 and 26 against the thermal head 11 through the thick portions b and c of the sheet 13. Then, the sheet 13 is fed by rotating the platen body portion 12*a*. The separate platen portions 12*b* and 12*c* are rotated in correlation to the feed of the sheet 13. In this case, since the relationship between the differences $t_1$ and $t_2$ in thickness between the thin portion a and the thick portions b and c of the sheet 13 and the differences $t_3$ and $t_4$ in outside diameter between the platen body portion 12*a* and the separate platen portions 12*b* and 12*c* of the platen 12 is $t_3=2t_1$ and $t_4=2t_2$, both the thin portion a and the thick portions b and c are pressed against the platen 12. Furthermore, as described above, since the urging forces of the coil springs 25 and 27 are set, the pressure $F_1$ received per unit length by the platen body portion 12*a* which is nipping or pinching the thin portion a of the sheet 13 in cooperation with the thermal head 11 is almost equal to the pressures $F_2$ and $F_3$ per unit length under which the separate platen portions 12*b* and 12*c* press the thick portions b and c of the sheet 13. Since the separate platen portions 12*b* and 12*c* are pressed toward the thermal head 11 by the urging means 18 and 26, respectively, variations of the differences $t_1$ and $t_2$ in thickness of the sheet 13 and the differences $t_3$ and $t_4$ in outside diameter between the platen body portion 12*a* and the separate platen portions 12*b* and 12*c* are absorbed by the space s, and the separate platen portions 12*b* and 12*c* are pressed against the thick portions b and c of the sheet 13, respectively.

Therefore, according to the above-illustrated embodiment, even though the thickness of the sheet is uneven in the print line direction, since the platen 12 and the thermal head 11 pinch the whole sheet 13 under almost uniform pressure, clear printing whose density is even can be achieved on the sheet 13.

Since the separate platen portion 12*b* and 12*c* are rotatable independent of the platen body portion 12*a*, a separate platen portions 12*b* and 12*c* can be rotated at the peripheral velocity equal to the feeding velocity of the sheet 13, which is fed by the platen body portion 12*a*. Thereby, since the feeding of the thick portions b and c of the sheet 13 is not delayed, even if the sheet 13 is made of thin and soft paper, skew and wrinkling do not occur.

Furthermore, since the separate platen portions 12*b* and 12*c* are supported by the pair of rollers 20 and 20 which are in parallel with the platen shaft 17, the degree of parallelization of the separate platen portions 12*b* and 12*c*, pressed by the rollers 20 and 20, with respect to the platen shaft 17 can be maintained.

Although the thermal transfer ribbon 14 is used in the above embodiment, the present invention also includes a printing apparatus which does not use a thermal transfer ribbon and directly records on a sheet of heat sensitive paper.

Although the thickness of the sheet 13 varies on three levels of the thin portion a and the thick portions b and c in the print line direction in the above embodiment, the thickness may vary on two or more than four levels instead of three steps.

Furthermore, although the sheet 13 is thin in the center thereof and thick on both sides thereof in the above embodiment, the present invention is applicable to the case in which a sheet having a thick center portion and thin sides is used.

Although the thin portion a of the sheet 13 is pressed against the platen body portion 12*a* in the above embodiment, a thick portion may be pressed against the platen body portion and a thin portion may be pressed against a separate platen portion.

In the above embodiment, the outside diameters $D_2$ and $D_3$ of the separate platen portions 12*b* and 12*c* are smaller by the double of differences $t_1$ and $t_2$ in thickness of the sheet 13, respectively, than the outside diameter $D_1$ of the platen body portion 12*a*. However, it is possible to made the differences $t_3$ and $t_4$ in outside diameter between the platen body portion 12*a* and the separate platen portions 12*b* and 12*c* smaller by widening the space s between the center holes of the separate platen portions 12*b* and 12*c* and the platen shaft 17.

Furthermore, although the platen shaft 17 of the platen body portion 12*a* is loosely fitted into the center holes of the separate platen portions 12*b* and 12*c* in the above embodiment, an independent shaft may be added besides the above platen shaft and loosely inserted into the center holes.

What is claimed is:

1. A line-type thermal printing apparatus for recording on a sheet while moving the sheet in a feeding direction, the sheet having a first portion which extends in the feeding direction and a second portion which extends in the feeding direction, the first and second portions of the sheet having different thicknesses, comprising:

a thermal head;

a platen which includes a platen body portion which rotates integrally with the platen shaft to feed the sheet, the first portion of the sheet being pinched between the thermal head and the platen body portion, and a separate platen portion with a center hole through which the platen shaft extends, the center hole being dimensioned to loosely fit the separate platen portion on the platen shaft, the separate platen portion having a periphery which faces the second portion of the sheet; and urging means for urging the separate platen portion so that the second portion of the sheet is pinched between the thermal head and the periphery of the separate platen portion.

2. A line-type thermal printing apparatus according to claim 1, wherein the urging means comprises a supporting shaft, a bracket rotatable on the supporting shaft, a pair of rollers retained in parallel by the bracket, and an elastic member for urging the bracket so as to press the pair of rollers against the separate platen portion, and thereby press the periphery of the separate platen portion against the second portion of the sheet.

3. A line-type thermal printing apparatus according to claim 1, wherein the sheet additionally has a third portion which extends in the feeding direction, the first and third portions having different thicknesses, the first portion of the sheet being disposed between the second portion and the third portion, and wherein the platen further comprises another separate platen portion with a center hole through which the platen shaft extends, the center hole of the another separate platen portion being dimensioned to loosely fit the another separate platen portion on the platen shaft, the another separate platen portion having a periphery which faces the third portion of the sheet, and further comprising another urging means for urging the another separate platen portion so that the third portion of the sheet is pinched between the thermal head and the peripheral of the another separate platen portion.

4. A line-type thermal printing apparatus according to claim 3, wherein the platen body portion receives a first force per unit length where the first portion of the sheet is pinched between the thermal head and the platen body portion, wherein the separate platen portion receives a reactive second force per unit length where the second portion of the sheet is pinched between the thermal head and the separate platen portion, wherein the urging means is configured so that the second force per unit length is approximately equal to the first force per unit length, wherein the another separate platen portion receives a reactive third force per unit length where the third portion of the sheet is pinched between the thermal head and the another separate platen portion, and wherein the another urging means is configured so that the third force per unit length is approximately equal to the first force per unit length.

5. A line-type thermal printing apparatus according to claim 3, wherein the first portion of the sheet is thinner than the second and third portions, and wherein the platen body portion is disposed between the separate platen portion and the another separate platen portion.

6. A line-type thermal printing apparatus according to claim 5, wherein the platen body portion has a length, wherein the thin portion of the sheet has a width, in a print line direction that is transverse to the feeding direction, and wherein the length of the platen body portion is smaller than the width of the thin portion of the sheet.

7. A line-type thermal printing apparatus according to claim 1, wherein the urging means comprises a pivotally mounted bracket, rollers mounted on the bracket, and means for urging the bracket toward the separate platen portion.

8. A line-type thermal printing apparatus according to claim 6, wherein the platen shaft has an axis of rotation, and wherein the platen body portion has a cylindrical periphery that is concentric to the axis of rotation.

* * * * *